(No Model.)
J. C. THAYER.
LUBRICATOR.
No. 294,161. Patented Feb. 26, 1884.
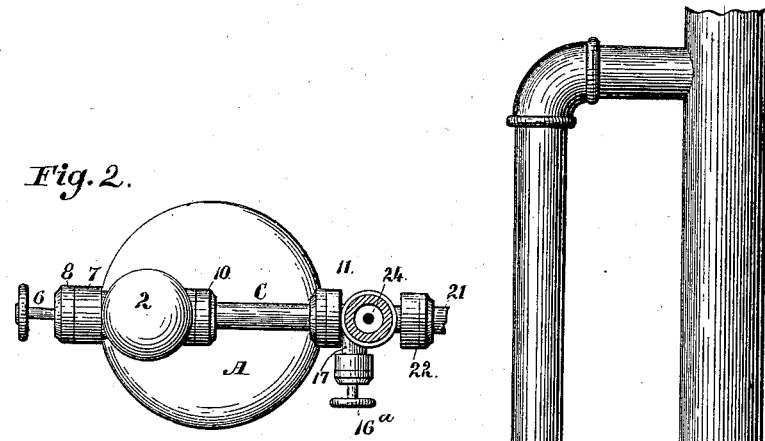
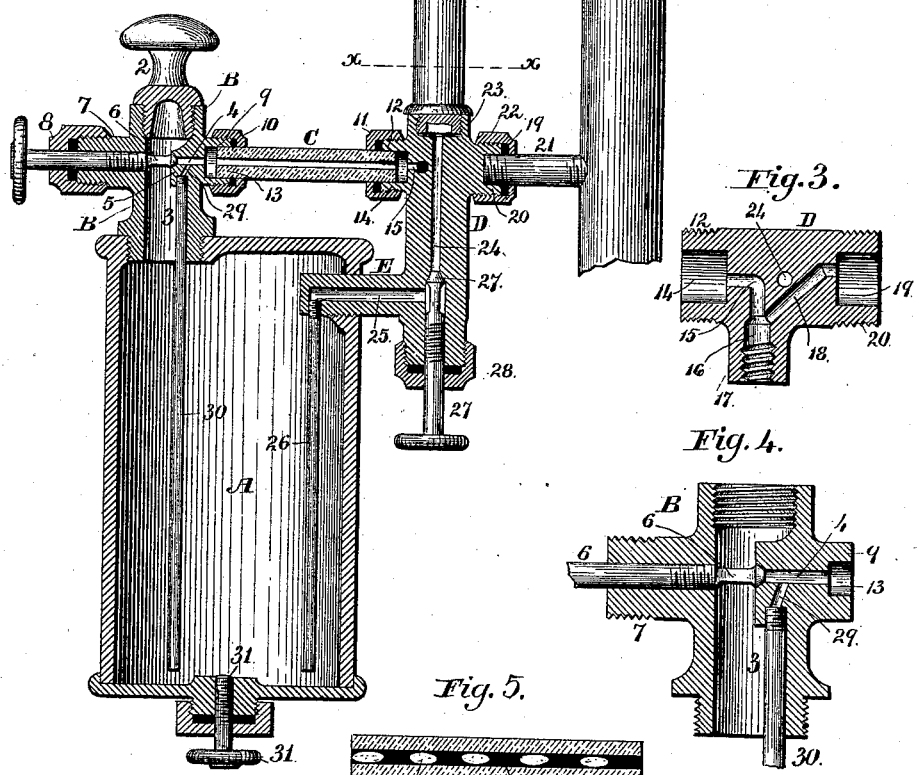
Witnesses:
J. Henry Kaiser.
Geo. T. Smallwood.
Inventor:
John C Thayer
By Jno. G. Elliott
Attorney

UNITED STATES PATENT OFFICE.

JOHN C. THAYER, OF CHICAGO, ILLINOIS.

LUBRICATOR.

SPECIFICATION forming part of Letters Patent No. 294,161, dated February 26, 1884.

Application filed June 20, 1882. (No model.)

*To all whom it may concern:*

Be it known that I, JOHN C. THAYER, a citizen of the United States, residing in Chicago, county of Cook and State of Illinois, have invented certain new and useful Improvements in Lubricators, of which the following is a specification.

This invention relates to improvements in lubricators in which a column or other pressure of water is employed to overcome the pressure of steam against the flow of oil to the desired destination, and which are provided with a transparent medium, more commonly termed a "sight-feed," through which the oil from the lubricator is caused to flow, so that by the eye the amount of oil being fed to the device to be lubricated may be determined.

The principal object of this invention is to produce a continuous flow of oil and water alternately through a sight-feed. Further objects are to utilize a moving column of water as a vehicle for the oil as it escapes to and flows through the sight-feed; to effectually utilize the cleansing properties and greater gravity of water for taking up and carrying off all foreign substances in or the particles of oil which would otherwise adhere to and partially, if not wholly, obscure the sight-feed; to readily and quickly reduce the oil, when congealed or heavy from cold, to a condition necessary for successful feeding; and, finally, to provide certain details of construction hereinafter described. These objects are attained by devices illustrated in the accompanying drawings, in which—

Figure 1 is a central longitudinal section of a lubricator embodying my invention, and showing its attachment to a condensing-pipe and steam-pipe. Fig. 2 is a plan view and section on the line $xx$ of Fig. 1, with the steam-pipe removed and the connection thereof with oil-cup broken off. Fig. 3 is a transverse section through the connection of the cup with the steam-pipe on an enlarged scale; Fig. 4, an enlarged detail, in section, of the plug or connection having the oil-passage and water cut-off. Fig. 5 is an enlarged detail longitudinal section of the sight-feed tube, showing the formation and arrangement of the alternate portions of oil and water.

Similar letters and numerals of reference indicate the same parts in the several figures of the drawings.

A represents a cylindrical oil-reservoir, constructed of suitable material adapted to withstand the required pressure, and provided with a stem, B, tapped into the top of the reservoir, closed by a stopper, 2, and adapted for filling purposes, and to form a connection between the upper portion of the reservoir and the sight-feed by means of its vertical passage 3 and horizontal passage 4, a part of which latter passage is formed in an internal projection, 5, of the stem. Passage 4 has its inner end closed by a valve, 6, the stem of which is preferably screw-threaded, to work in a projecting arm, 7, of the stem B, a tight joint being formed between the valve-stem and arm by a cap, 8, and suitable packing. The sight-feed is composed, preferably, of a glass tube, C, having an end bearing against or projecting partially into an arm, 9, of the stem B, and held by a cap, 10, screw-threaded on the arm, and provided with suitable packing. The opposite end of the sight-feed is similarly secured by a cap, 11, on an arm, 12, of a casting, D, having a right-angular branch, E, projecting into the side of the oil-reservoir near its top. When desirable to confine the ends of the sight-feed tube within the arms 9 and 12, these arms are bored out, as shown at 13 and 14, so that after inserting one end of the sight-feed in, say, chamber 14, it may be drawn forward into 13 and tightened, as shown in Fig. 1, thus providing for a convenient and ready insertion of the original or of a new tube in place of a broken one.

Communicating with the chamber 14 or directly with the bore of the sight-feed, as the case may be, is a horizontal right-angular passage, 15, (see Figs. 1 and 3,) opening into a valve-chamber, 16, in arm 17 of casting D, from which chamber leads an angular passage, 18, opening into the bored-out chamber 19 in the arm 20 of the casting D. A valve, 16ª, (see Fig. 2,) operates in valve-chamber 16, to control the feed of the lubricant, which must first enter the valve-chamber before escaping through passage 18 to its destination.

Screwed or socketed in chamber 19 is nipple 21, a tight joint being formed by a cap, 22, and suitable packing, said nipple being tapped in steam-pipe F, which leads to the device to be lubricated, and is generally the steam-supply pipe of such device; but it should here be stated that the lubricator may be attached directly to the device to be lubricated.

By the construction so far described, oil in the reservoir may rise in the passage 3 and flow through the sight-feed to its destination, and be regulated by the valve $16^a$, working in chamber 16, or be entirely cut off from the sight-feed by said valve; and it now remains to be shown how the oil is caused to flow to the steam-pipe against the pressure of steam therein to which the oil is necessarily subjected.

Tapped in an arm, 23, of casting D and rising above the lubricator is a condensing-pipe, G, opening at its upper end into the steam-pipe, and operating as a head or source for the water of condensation employed to force the oil out of the reservoir, for, as will be seen, steam entering the pipe G will condense therein, and will form a head exerting an upward pressure on the oil in the reservoir, the amount of this hydrostatic pressure depending upon the height of the condensations or other water in the pipe.

Opening into the condensing-pipe is a water-passage, 24, formed vertically in casting D, and intersecting with a horizontal passage, 25, in the branch E, from which passage 25 extends downwardly to near the bottom of the oil-reservoir a pipe or tube, 26, a valve, 27, working on an inclined seat in passage 24, serving to cut off or regulate the flow of water from the condenser to the reservoir, and a cap, 28, and packing forming a tight joint between the screw-threaded stem of the valve and casting D.

In the projection 5 of plug B and opening into passage 4 is an inclined passage, 29, forming a water cut-off to the oil after entering passage 4, and continued downwardly to near the bottom of the reservoir by a tube, 30, tapped or otherwise secured in projection 5 of the plug, and forming, with passage 29, a water-induction passage. The cut-off is preferably inclined, to avoid obstructing the flow of the oil and water, as might be if the water struck the stream of oil at a right angle to its line of travel. Valves 6 and 27 are preferably provided with a circumferential groove in the rear of their inclined operative ends, so as to afford the least possible obstruction to the flow of the liquids around them and in the passages in which the stems operate.

To operate the lubricator when the several parts are in the position shown and the valve $16^a$ is closed, the plug 2 is removed, and, after the reservoir is filled with oil, is again screwed down to place. Steam is now admitted to pipe G, which may be provided with a suitable valve for that purpose, and as soon as sufficient condensation has accumulated in the pipe valve 27 is opened, to admit the water of condensation to the reservoir, where, by its superior gravity and its head in the condenser, it exerts an upward pressure on the oil, and, rising in tube 30, passes through the cut-off passage 29 and passage 4 into the sight-feed. Valve 6 is now opened, and next valve $16^a$, when the water immediately takes an onward course, followed by the oil in a globular form, through the sight-feed and passages 15 and 18, to their destination. The water passing up tube 30 and passage 29 is subject to the same upward pressure as the oil; but, owing to the superior gravity of the water and its tendency to divide oil on a comparatively non-saturable surface, the water escaping from the passage 29 operates as a cut-off to the oil flowing through passage 4, and as a result the oil is divided into a globular form before entering the sight-feed, a portion of water following each globule of oil, so that there is a continuous feed of alternate oil globules and water through the sight-feed during the operation of the lubricator.

The terms "globular" and "globule" are here used more as expressions of quantity than form, for, as a matter of fact, the water assumes more of a spherical form than the oil, which is slightly concaved at each end, owing to its lightness as compared with water, and the tendency of the oil to adhere to the glass, which tendency is constantly and effectively resisted by the water. In this connection it may be stated that for an effective feeding through the sight-feed of oil in globular quantities the bore of the sight-feed should not have a diameter in excess of that of a maximum-sized oil globule in its normal condition. The size of each oil globule being fed is regulated by valve 6, the quantity of water by valve 27, and the combined flow of oil and water by valve $16^a$—as, for instance, with the latter and valve 27 wide open the valve 6 may be so adjusted as to admit oil in a fine stream to passage 4, and consequently the water, flowing at full speed and volume through the cut-off, would divide the oil into very small globules, and be interposed in larger quantities between each two globules of oil than if the flow of water were correspondingly diminished by partially closing valve 27. On the other hand, if valve 6 is wide open and valve 27 partially closed, it will follow that the oil globules will be larger and the quantity of water between each two globules of oil less, and so the adjusting of valve $16^a$ will regulate their combined flow through the sight-feed and to the device to be lubricated, however the proportions of oil and water may be varied.

Feeding water with oil through the exit-passages of the reservoir of a lubricator to the device to be fed is the most important feature of this invention and of its results, for by this flow of water a positive and effective vehicle for the oil is provided, to insure a reliable and uniform feed of oil, and all of the passages, including the sight-feed, are thoroughly washed before and after each globule of oil passes through them, so that accumulation of sediment and adhering of gummy substances in them, which would obstruct a free flowing of the oil, are entirely avoided, and, besides, the sight-feed is maintained perfectly transparent at all times. Clean passages diminish the friction of, and hence promote a steadiness in, the flowing of the oil, and, besides, result in a material saving in time and expense otherwise incurred in stopping the operation of the lubricator to blow it out, which operation is liable to fracture the sight-feed and involve a further loss of time and expense in replacing it with a new one. Should the passages become gummed, stained, or obstructed from oil standing in them any length of time—that is, when the lubricator is not in active use—the closing of valve 27 and opening of valves 6 and 16$^a$ will permit steam to be driven through the oil-passages and blow them out, which steam may be allowed to escape out the top of the reservoir by removing stopper 2; or by removing stopper 31 at the bottom of the reservoir and drawing off whatever oil or water, or both, is in the reservoir, the latter and the water cut-off may also be blown out; or, with an empty reservoir and the valves 6 or 16$^a$ closed and either of the stoppers removed and valve 27 open, the condenser and water-passages leading therefrom may be blown out.

A further advantage accruing to my invention is that of providing for readily and successfully reducing to and maintaining at an operative consistency oil congealed or heavy from cold, or normally too thick to flow freely, which reduction is attained by the employment of a continuous flow through all the passages and into the reservoir, of water of condensation which retains sufficient heat to thin the oil and maintain the several parts of the lubricator at a temperature sufficient for keeping the oil in liquid condition.

The invention herein involved may be attained by a widely-different construction and arrangement of parts from that shown and hereinbefore described—as, for instance, instead of locating the cut-off as shown, it may be located at some other point or angle in relation to the oil-passage from the reservoir, and instead of having the water for the cut-off pass through the induction-pipe 30, such pipe can be dispensed with, and the water be taken from the condensing-pipe G by a suitable pipe leading to the plug B and communicating with the oil-passage 4 by a suitable opening corresponding to cut-off 29, but leading inside, in relation to the oil-passage.

The valves may be arranged to work at a right angle instead of in line with their respective passages, and the several passages may be varied in their relative positions to each other and to the condenser, which latter may be connected to the steam-pipe from its lower end, as in other lubricators now in use, and it would not involve inventive skill to shift the position of the sight-feed from a horizontal to a vertical line, or to operate the reservoir at a right angle to the condensing-pipe or parallel with the sight-feed.

The plug B and casting D may also have a different form and arrangement relative to each or to the reservoir, and the stopper 2 be inserted in a filling-aperture directly in the reservoir.

Having now described my invention, what I claim, and desire to secure by Letters Patent, is—

1. The combination, in a lubricator, of a sight-feed tube filled with alternately-arranged portions of oil and water during the operation of the lubricator, and means for supplying said oil and water to the sight-feed, substantially as described.

2. The combination of the sight-feed of a lubricator, with oil-passages leading from the reservoir, and a water-eduction passage intersecting with said oil-passages, substantially as and for the purpose described.

3. The combination of the sight-feed of a lubricator, with intersecting oil and water eduction passages, and a valve controlling one of said passages, substantially as described.

4. The plug B, provided with passages 3 4, and a water-cut-off passage, in combination with an oil-reservoir and means for conducting the oil and water to said passages and the device to be lubricated, substantially as described.

5. The combination, with the sight-feed and the oil-passage leading thereto, of the angular passages 15 and 18 and a valve working in said passages at their intersection, substantially as described.

6. The reservoir, the casting D, provided with passages 24 and 25, valve 27, induction-pipe 26, and eduction-pipe 30, in combination with plug B, cut-off passage 29, passage 4, valve 6, and sight-feed tube C, substantially as described.

7. The casting D, provided with the passages 24 25 and 15 18, induction-pipe 26, valve 27, and the reservoir, in combination with the plug B, provided with passages 3 and 4, cut-off 29, eduction-pipe 30, and a sight-feed tube, substantially as described.

8. The reservoir, the casting D, and plug B, constructed as described, induction-pipe 26, eduction-pipe 30, and valves 6 and 27, in combination with the sight-feed C, condensing-pipe G, steam-pipe H, and nipple 21, substantially as described.

9. The herein-described method of lubricating, the same consisting in continuously feeding a stream composed of alternate portions of oil and water through a passage or passages leading to the device to be lubricated.

10. The herein-described method of lubricating, the same consisting in continuously feeding a regulated stream composed of alternate portions of oil and water, in desired variable proportions, through a passage or passages leading to the device to be lubricated.

JOHN C. THAYER.

Witnesses:
ALBERT H. ADAMS,
EDGAR T. BOND.